(12) United States Patent
Quarmby et al.

(10) Patent No.: US 9,217,508 B2
(45) Date of Patent: Dec. 22, 2015

(54) SEALS

(75) Inventors: Nicholas Derek Quarmby, Dubai (AE); Bhikhubhai Chhanabhai Patel, Lancashire (GB)

(73) Assignee: John Crane UK Limited, Slough (GB)

( * ) Notice: Subject to any disclaimer, the term of this patent is extended or adjusted under 35 U.S.C. 154(b) by 154 days.

(21) Appl. No.: 13/993,802

(22) PCT Filed: Dec. 12, 2011

(86) PCT No.: PCT/GB2011/001711
§ 371 (c)(1),
(2), (4) Date: Jul. 3, 2013

(87) PCT Pub. No.: WO2012/080693
PCT Pub. Date: Jun. 21, 2012

(65) Prior Publication Data
US 2013/0292909 A1    Nov. 7, 2013

(30) Foreign Application Priority Data
Dec. 14, 2010   (GB) .................................. 1021266.0

(51) Int. Cl.
*F16J 15/34*    (2006.01)
*F16J 15/16*    (2006.01)
*F16J 15/00*    (2006.01)

(52) U.S. Cl.
CPC .............. *F16J 15/166* (2013.01); *F16J 15/006* (2013.01)

(58) Field of Classification Search
CPC .... F16J 15/3268; F16J 15/3256; F16J 15/324
See application file for complete search history.

(56) References Cited

U.S. PATENT DOCUMENTS 3,194,568 A * 7/1965 Payne .................... F04B 39/041
                                                          277/514
3,542,374 A * 11/1970 Neilson ................. F04B 39/041
                                                          277/544

(Continued)

FOREIGN PATENT DOCUMENTS

GB              694230          7/1953
WO        WO 03/046335 A        6/2003

(Continued)

OTHER PUBLICATIONS

European Patent Office, International Search Report in International Patent Application No. PCT/GB2011/001711 (Feb. 4, 2012).

(Continued)

*Primary Examiner* — Gilbert Lee
*Assistant Examiner* — L. Susmitha Koneru
(74) *Attorney, Agent, or Firm* — Leydig, Voit & Mayer, Ltd.

(57) ABSTRACT

An elastomeric or polymeric seal assembly (10) includes an annular elastomeric or polymeric sealing element (60), an internal circumferential surface of which sealingly engaging a first component (12), the sealing element abutting a radial annular face of a second component (16) and an external circumferential surface of the sealing element sealingly engaging an internal circumferential surface of a second component, a vent (92) being provided in the internal circumferential surface of the second component adjacent to the radial face, to vent the space between the external circumferential surface of the sealing element and the internal circumferential surface of the second component, an inlet to the vent being defined by an annular groove (88) in the internal circumferential surface of the second component, an annular helically wound element (94) being provided in the annular groove to prevent extrusion of the sealing element into the vent, the helically wound element being formed from a strip of material of elongate section, adjacent winds of material being spaced from one another.

20 Claims, 4 Drawing Sheets

(56) References Cited

U.S. PATENT DOCUMENTS

| | | | | |
|---|---|---|---|---|
| 3,544,118 A * | 12/1970 | Klein | F16J 15/006 | 277/447 |
| 4,284,280 A * | 8/1981 | Bertram | F16J 15/006 | 277/436 |
| 4,333,661 A * | 6/1982 | Merrell | F02G 1/0445 | 277/458 |
| 4,379,558 A * | 4/1983 | Pippert | E21B 33/1216 | 277/536 |
| 5,700,013 A * | 12/1997 | Baty | F16J 15/3464 | 277/340 |
| 5,899,460 A * | 5/1999 | Altieri | F16J 15/3464 | 277/352 |
| 6,007,105 A | 12/1999 | Dietle et al. | | |
| 6,161,838 A * | 12/2000 | Balsells | F16J 15/3216 | 277/511 |
| 6,279,914 B1 * | 8/2001 | Yamanaka | F16J 15/3268 | 277/394 |
| 6,422,570 B2 * | 7/2002 | Ikeda | | 277/549 |
| 6,932,351 B1 * | 8/2005 | Mowll | F04B 39/00 | 277/512 |
| 2004/0245727 A1 | 12/2004 | Bunn | | |
| 2005/0253340 A1 * | 11/2005 | Ramsay | F16J 15/008 | 277/559 |
| 2008/0029967 A1 * | 2/2008 | Nakagawa | F16J 15/3256 | 277/349 |
| 2010/0288793 A1 * | 11/2010 | Schaupp | F04C 2/18 | 222/333 |
| 2011/0084454 A1 * | 4/2011 | Quarmby | F16J 15/348 | 277/307 |
| 2011/0298183 A1 * | 12/2011 | Lindner-Silwester | F04B 39/0022 | 277/500 |
| 2012/0098204 A1 * | 4/2012 | Quarmby | F16J 15/3404 | 277/388 |
| 2012/0313329 A1 * | 12/2012 | Battles | B29C 70/78 | 277/565 |

FOREIGN PATENT DOCUMENTS

| | | |
|---|---|---|
| WO | WO 2007/035588 A2 | 3/2007 |
| WO | WO 2007/035588 A3 | 3/2007 |

OTHER PUBLICATIONS

European Patent Office, Written Opinion in International Patent Application No. PCT/GB2011/001711 (Feb. 4, 2012).

* cited by examiner

SEALS

The present invention relates to annular sealing elements formed from elastomeric or polymeric materials and seal assemblies including such sealing elements.

With such sealing elements, an internal circumferential surface of the sealing element sealingly engages one component while the sealing element is forced axially against a radial face of a second component, so that an outer circumferential surface of the sealing element sealingly engages a circumferential surface of the second component, to provide a seal between the two components.

With seals of this type, for example elastomeric O-rings or polymeric lip seals, pressure of fluid trapped between the external circumferential surface of the sealing element and the second component will prevent proper sealing of the sealing element with respect to the second component and, particularly in high pressure applications, may produce a radial load urging the internal circumferential surface of the sealing element into engagement with the first component, which may lead to excessive wear.

In accordance with the present invention, the space between the external circumferential surface of the sealing element and the second component is vented, so that the pressure acting on the external circumferential surface of the sealing element may be reduced.

According to one aspect of the present invention, an elastomeric or polymeric seal comprises an annular elastomeric or polymeric sealing element, an internal circumferential surface of the sealing element sealingly engaging a first component, the sealing element abutting a radial annular face of a second component and an external circumferential surface of the sealing element sealingly engaging an internal circumferential surface of a second component, a vent being provided in the internal circumferential surface of the second component adjacent to the radial face, to vent the space between the external circumferential surface of the sealing element and the internal circumferential surface of the second component, an inlet to the vent being defined by an annular groove in the internal circumferential surface of the second component, an annular helically wound element being provided in the annular groove to prevent extrusion of the sealing element into the vent, the helically wound element being formed from a strip of material of elongate section, adjacent winds of material being spaced from one another.

In accordance with this aspect of the present invention, the vent allows fluid trapped between the sealing element and second component to be vented away thereby reducing the pressure of fluid acting on the external circumference of the sealing element, so as to allow proper sealing of the sealing element with the second component and avoiding overloading of the sealing element onto the first component under high pressure application. The annular helically wound element prevents extrusion of the sealing element into the vent, while permitting the passage of fluid.

According to a further aspect of the present invention a seal assembly between a first and second relatively rotatable component, the first component extending coaxially of a bore of the second component the external surface of the first component being spaced radially of the surface of the bore, comprises an excluder seal located at a high pressure end of the seal assembly, the excluder seal acting to prevent the flow of fluid into the space between the external surface of the first component and the internal surface of the bore, and a plurality of elastomeric or polymeric sealing elements sealing between the external surface of the first component and the internal surface of the bore, said elastomeric or polymeric sealing elements being spaced axially of the excluder seal and of one another to define a series of chambers therebetween, inlets being provided to the chambers between adjacent elastomeric or polymeric sealing elements whereby a barrier fluid under pressure may be introduced into the chambers.

The excluder seal may be one or more lip seals, one or more spring energised polymer seals or a mechanical face seal.

The invention is now described, by way of example only, with reference to the accompanying drawings in which.

Figure 1:
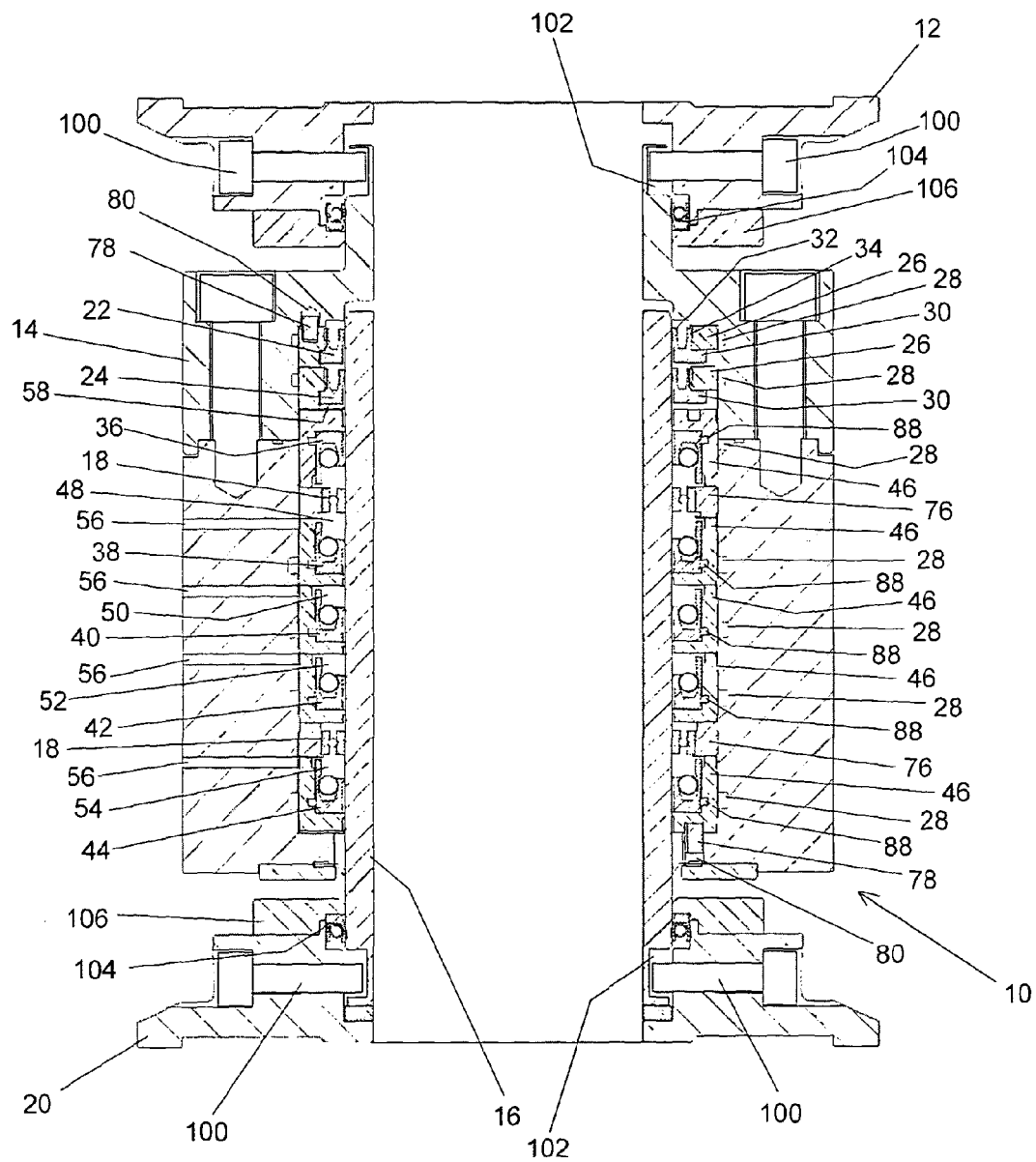
FIG. 1 illustrates in sectional elevation, a seal assembly for the wash pipe of a drilling rig.
Figure 5:
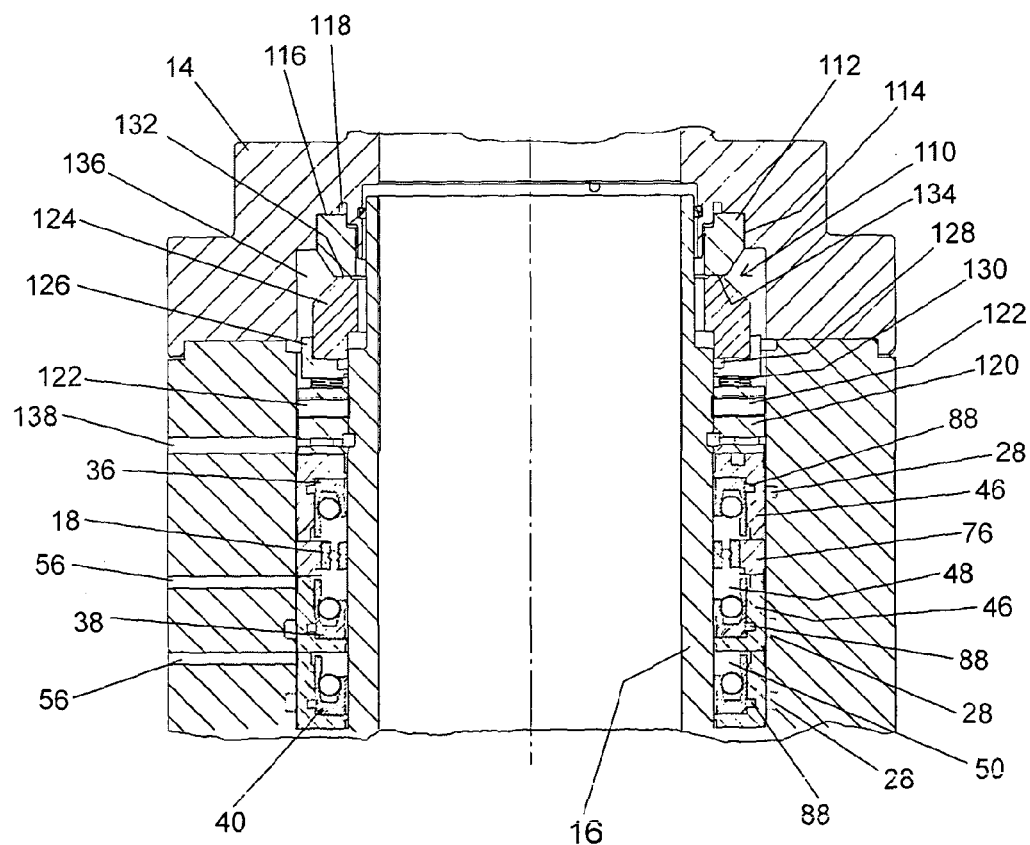
Figure 6:
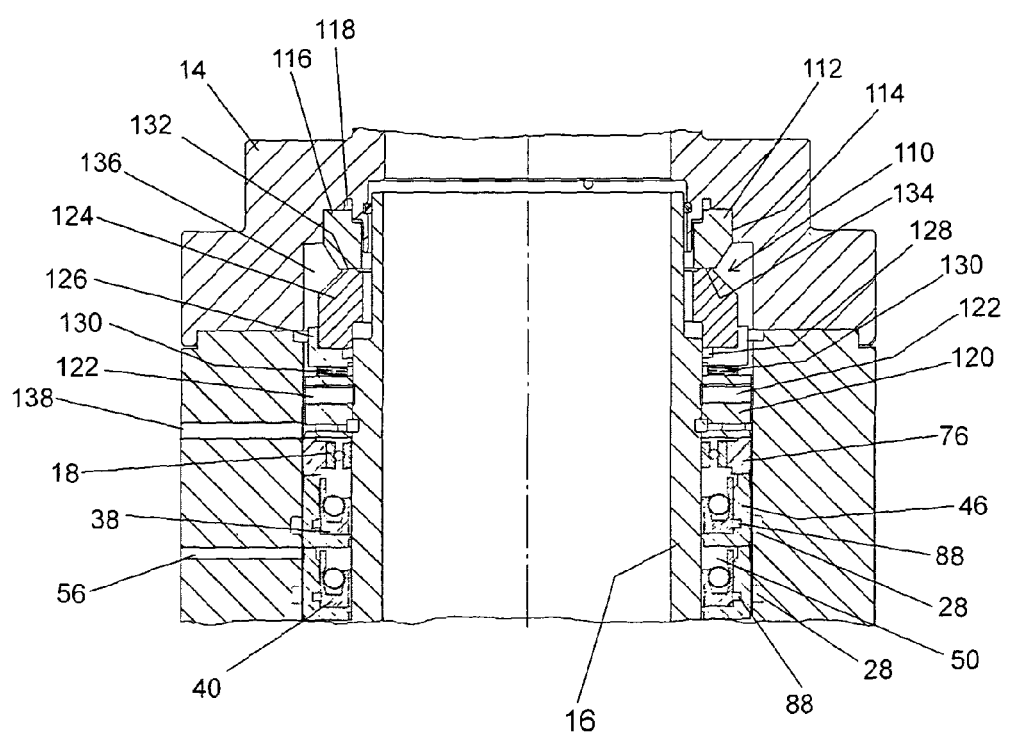

FIG. 5 is a part sectional elevation illustrating an alternative seal assembly similar to that illustrated in FIG. 1; and FIG. 6 is a part sectional elevation illustrating an further alternative seal assembly similar to that illustrated in FIG. 1; and FIG. 1 illustrates a seal assembly 10, by which a drilling rig mud delivery pipe of a drilling derrick is connected to a rotary drive means of the derrick, whereby mud at high pressure, for example 500 bar or greater, may be supplied to the drill pipes.

The seal assembly 10 comprises a stationary first connector 12 which is adapted to be connected to a drilling mud supply pipe (not shown). The first connector 12 is non-rotatably connected to a seal housing 14. A wash tube 16 is mounted coaxially of the seal housing 14, the wash tube 16 being rotatably mounted to the seal housing 14 by axially spaced ball bearings 18. The end of the wash tube 16 remote from the first connector 12 is non-rotatably connected to a second connector 20. The second connector 20 is adapted to be connected to drill pipes (not shown), so that the second connector 20 and wash pipe 16 will rotate with the drill pipes when the drill pipes are driven by the derricks' rotary drive means.

A pair of excluder seals 22, 24 are provided in axially spaced relationship adjacent the end of the seal housing 14 at the end of the seal housing connected to the first connector 12. The excluder seals 22, 24 are in the form of lip seals having spaced apart limbs 32, 34 extending axially, mounted in rings 26 which are sealed to an internal circumferential surface of the seal housing by means of sealing elements located in grooves 28 in the seal housing 14. Radially extending lugs 30 on the excluder seals 22, 24 locate in corresponding recesses in the rings 26 to prevent rotation of the excluder seals 22, 24. The limbs 32, 34 of the excluder seals 22, 24 extend towards the first connector 12, so that the pressure of mud supplied to the first connector will urge the limbs 32, 34 of the excluder seals 22, 24 into sealing engagement with the wash tube 16 and the rings 26 respectively. Furthermore, the excluder seals 22, 24 are free to move axially within their respective rings 26 to allow the pressure of the mud to balance the pressure of a barrier fluid behind the excluder seals 22, 24. This reduces the pressure differential across the excluder seals 22, 24 and extends the life thereof. For example if the mud pressure is higher than the fluid pressure behind each excluder seal 22, 24, the excluder seal 22, 24 would move towards the lower pressure region, i.e. backwards to balance the pressure. However, if the fluid pressure behind each excluder seal 22, 24 is greater than the mud pressure, the fluid would leak past the limbs 32, 34 of the excluder seal 22, 24 and into the mud to balance the pressure.

A series of axially spaced spring energised polymer seals 36, 38, 40, 42, 44 are located between the seal housing 14 and wash tube 16, the seals 36, 38, 40, 42, 44 being spaced axially between the inner excluder seal 24 and the second connector 20. The polymer seals 36, 38, 40, 42 and 44 are located in rings 46 which are sealed to the internal circumferential surface of the seal housing by sealing elements located in grooves 28 in the seal housing 14. Each pair of adjacent polymer seals 36, 38, 40, 42 and 44, define a sealed chamber 48, 50, 52, 54 therebetween, an inlet 56 being provided to each of the sealed chambers 48, 50, 52 and 54.

The polymer seals 36, 38, 40, 42 and 44, each comprise a channel section polymer ring having a base portion 60 and inner and outer limb formations 62, 64. A garter spring 66 is located between the limbs formations 62, 64 and resiliently urges the limb formations 62, 64 into sealing engagement with an external circumferential surface of the wash tube 16 and an inner circumferential surface of the associated ring 46. Formations (not shown) on the base portion 60 of polymer seals 36, 38, 40, 42 and 44 engage corresponding formations on the rings 46 to prevent relative rotation therebetween.

Figure 2:
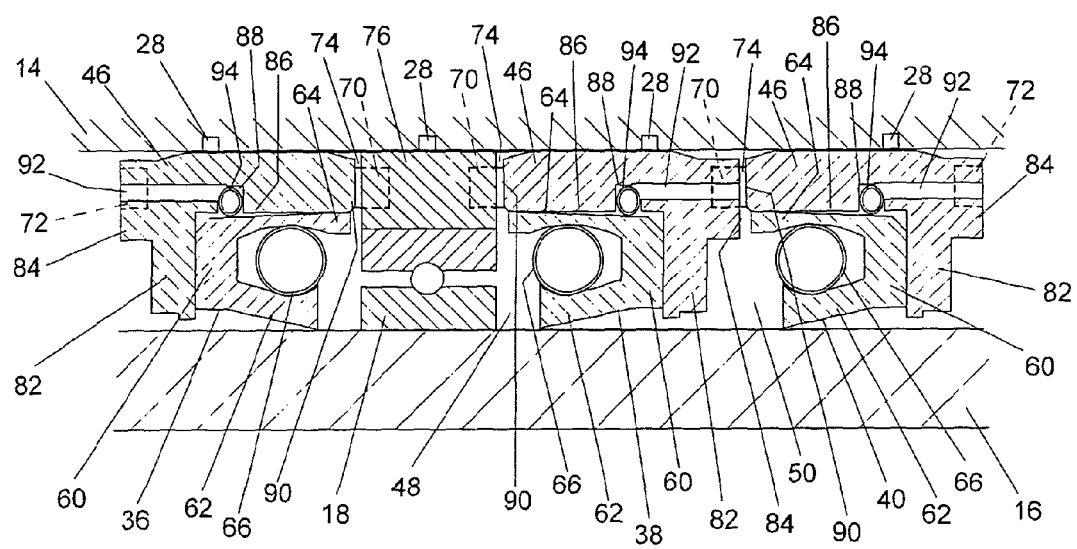
FIG. 2 illustrates a partial enlargement of the seal assembly shown in FIG. 1.
Figure 3:
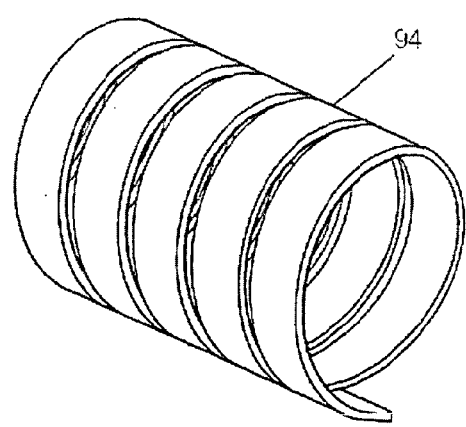
FIG. 3 illustrates an annular helically wound element as used in the seal assembly shown in FIG. 1.

As illustrated in detail in FIG. 2, the rings 46 have angularly spaced axially extending lugs 70 which engage corresponding recesses 72 in the adjacent ring 46, so that the rings 46 may be mounted in the seal housing 14 non-rotatably with respect to one another. The lugs 70 extend axially to a greater extent that the recesses 72, so that when the rings 46 are assembled, annular recesses 74 are provided between adjacent rings 46. Similar lugs and recesses (not shown) are provided in rings 26 and rings 76 which support bearings 18, so that the rings 26 and 76 may be non-rotatably assembled in the seal housing 14, with respect to the rings 46. Pins 78 engage in corresponding axial bores 80 in the end rings 26, 46 and adjacent radial faces of the seal housing 14, thus preventing rotation of the rings 26, 46, 76 relative to the seal housing 14.

A radially inwardly directed flange formation 82 is provided adjacent a first end 84 of each of the rings 46, against which the base portion 60 of the polymer seal 36, 38, 40, 42, 44 abuts, the outer limb 64 of the polymer seal 36, 38, 40, 42, 44 engaging the bore 86 of the ring 46 towards a second end 90. An annular groove 88 is provided in the bore 86 adjacent the flange formation 82, on the side of the flange formation 82 open to the second end 90. One or more passageways 92 extend axially from the annular groove 88 to the first end 84 of the ring 46, so that when the rings 46 are assembled in the seal housing 14, the passageway 92 will open to the annular recess 74 between the rings 46.

An annular helically wound element 94 is located in each annular groove 88. The helically wound element 94 is formed from resilient strip material of elongate cross section. The diameter of the external circumference of the helically wound element is slightly greater than the diameter of the base of the annular groove 88 and adjacent winds of the helically wound element 94 are spaced from one another, so that when the helically wound element 94 is partially compressed by engagement of the external diameter of the helically wound element 94 with the base of annular groove 88 the winds of the helically wound element 94 will remain spaced from one another. The helically wound element 94 also extend radially from the annular groove 88 into the bore of ring 46, so that it engages the base portion of the polymer seal 36, 38, 40, 42, 44. The helically wound element 94 will thereby resiliently centre the polymer seal 36, 38, 40, 42, 44 and will further oppose rotation of the polymer seal 36, 38, 40, 42, 44 relative to the ring 46.

The channel section polymer seals 36 and 38 open to chamber 48, while polymer seals 40, 42 and 46 open to chambers 50, 52 and 54 respectively.

A barrier fluid is introduced under pressure to the chambers 48, 50, 52 and 54 via the associated inlets 56. The pressure of barrier fluid in chamber 48 is slightly in excess of the pressure of drilling mud delivered by the mud delivery pipe to the first connector 12. The pressure of barrier fluid in chambers 50, 52 and 54 is reduced progressively, so that the pressure drop across each of the polymer seals 38, 40, 42 and 44 is substantially equal. In this manner the pressure differential from the drilling mud pressure to atmospheric pressure is reduced in stages, so that no single polymer seal 36, 38, 40, 42, 44 is subjected to a pressure differential which would cause excessive wear.

Pressure sensing means (not shown) may be provided to monitor changes in the drilling mud pressure and control the pressure of barrier fluid delivered to each of the chambers 48, 50, 52 and 54.

Barrier fluid is introduced into the chamber 58 between excluder seal 24 and polymer seal 36, by leakage from chamber 48 across polymer seal 36.

Should one of the polymer seals 36, 38, 40, 42, 44 fail, the supply of barrier fluid to the chamber 48, 50, 52, 54 down stream of that seal 36, 38, 40, 42, 44 is interrupted and the pressure of barrier fluid supplied to the other chambers 48, 50, 52, 54 adjusted accordingly, so that the pressure differential across the other polymer seals 36, 38, 40, 42, 44 is equalised.

When the chambers 48, 50, 52, 54 are pressurised, the pressure of fluid in the chambers 48, 50, 52, 54 will urge the limbs 62, 64 of the polymer seals 36, 38, 40, 42, 44, into sealing engagement with the wash tube 16 and bores 86 of rings 46 respectively. Any fluid trapped between limb 64 and the bore 86 of ring 46 will be expelled through the annular groove 88 and passageway 92, into the chamber 50, 52 or 54 on the lower pressure side of the polymer seal 38, 40, 42, 44 or in the case of polymer seal 36 to the chamber 58 between polymer seal 36 and excluder seal 24 which is also at a lower pressure than chamber 48. The removal of trapped fluid allows the outer lips 64 of the polymer seals 36, 38, 40, 42, 44 to seal properly against the bore 86 of ring 46 and avoid the build up of pressure on the external circumference of the polymer seal 36, 36, 40, 42, 44 which may lead to excessive wear. The helically wound element 94 prevents the polymer seal 36, 36, 40, 42, 44, from being extruded into the annular groove 88 whilst permitting the passage of fluid.

As illustrated in FIG. 1 the first connector 12 may be connected to the seal housing 14 and/or the second connector 20 may be connected to the wash tube 16, so as to permit relative movement thereof with respect to a plane transverse to the axis of the seal housing 14 and wash tube 16, in order to accommodate axial and angular misalignment of the first or second connector 12, 20 with the seal housing 14 or wash tube 16 respectively.

As illustrated the first connector 12 is secured to the seal housing 14 and the second connector 20 is connected to the wash tube 16 by means of a series of angularly spaced screws 100 which engage radial threaded bores in the connector 12, 20 and extend radially into an annular recess 102 in the seal housing 14, wash tube 16. The screws 100 terminate short of the base of the recess 102.

A spring energised polymer seal 104 is provided between circumferential surfaces of the first connector 12 and seal housing 14 and between the second connector 20 and wash tube 16. The static spring energised polymer seals 104 which act between the relatively non-rotational first connector 12 and seal housing 14 and between the second connector 20 and wash tube 16, open towards the connectors 12 and 20, to prevent mud from leaking from the wash tube 16 to atmosphere. An outer ring 106 is secured to the first connector 12 and second connector 20 to retain the polymer seal 104.

Means (not shown) is provided to prevent rotation of the first connector 12 relative to the seal housing 14 and to prevent rotation of the second connector 20 relative to the wash tube 16.

The clearance between the screws 100 and the bases of recesses 102 allows the first connector 12 to tilt in a transverse plane relative to the seal housing 14 and the second connector 20 to tilt in a transverse plane relative to the wash tube 16, the connectors tilting about the polymer seals 104.

Figure 4:
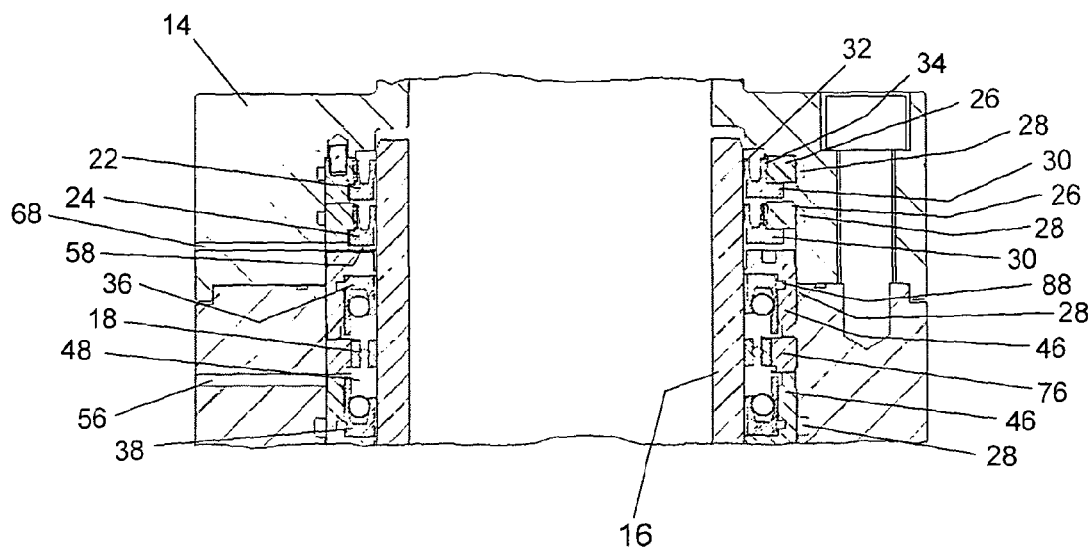
FIG. 4 is a part sectional elevation illustrating a modification to the seal assembly shown in FIG. 1.

In the modification illustrated in FIG. 4, an inlet 68 is provided to the chamber 58 between the excluder seal 24 and polymer seal 36, through which barrier fluid my be introduced into chamber 58. The pressure of barrier fluid in chamber 58 may be maintained at a pressure intermediate of the pressure in chamber 48 and the mud pressure by supplying pressurised barrier fluid from an external source, on a continuous basis or as a volumetric dose injected at intervals.

In the alternative embodiment illustrated in FIG. 5, the excluder seals 22, 24 are replaced by a mechanical face seal 110. The mechanical face seal 110 comprises a first seal face ring 112, which is fitted within a stepped bore 114 of the seal housing 14. The first seal ring 112 abutting a shoulder portion 116 of the stepped bore 114 and is sealed with respect thereto by means of an elastomeric sealing ring located in an axially extending annular recess 118. One or more pins (not shown) engage in axially extending bores in the shoulder portion 116 and seal face ring 112, to prevent rotation of the seal face ring 112 relative to the seal housing 14.

A collar 120 is clamped on the external surface of the wash tube 16 by means of a plurality of angularly spaced set screws 122. The collar 120 is spaced axially from the first seal face ring 112. A second seal face ring 124 in mounted in a retainer ring 126 slidably mounted on the external surface of the wash tube 16. The retainer ring 126 being sealed to the wash tube 16 by means of an elastomeric ring between a rear face of the second seal face ring 124 and the retaining ring 126, in a recess 128 in the retaining ring 126. Means, for example an axially extending groove in the internal circumferential surface of the second seal face member 124 or retainer ring 126 and a projection on the external surface of the wash tube 16 (not shown), is provided for prevention rotation of the second seal face member 194 relative to the wash tube 16, whilst permitting relative axial movement. A series of angularly spaced helical compression springs 130 are located in axially extending closed bores in the collar 120 and act against the retainer ring 126 to urge a sealing face 132 of the second seal face ring 124 into sealing engagement with a corresponding sealing face 134 on the first seal face ring 112.

The chamber 136 formed externally of the seal face rings 112 and 124 is connected to an external source of barrier fluid, at a pressure intermediate of the pressure of barrier fluid in chamber 48 between polymer seals 36 and 38, and the mud pressure, by means of inlet 138. As with the previous embodiments the excess pressure in chamber 136 will prevent abrasive mud from leaking between the sealing faces 132, 134, the barrier fluid leaking from chamber 136 towards the mud, to lubricate the sealing faces 132, 134.

In the embodiment illustrated in FIG. 6, the mechanical face seal 110 replaces the excluder seals 22, 24 and the polymer seal 36 of the embodiment illustrated in FIG. 1. In this embodiment the maximum barrier fluid pressure is applied to the chamber 136 formed externally of the seal face rings 112 and 124. The pressure of the barrier fluid is then reduced in stages in chambers 50, 52 and 54.

Various modifications may be made without departing from the invention. For example while in the above embodiments the invention has been described with reference to spring energised polymer seals, the invention is equally applicable to any annular elastomeric or polymeric sealing element.

Furthermore while the invention has been described with reference to a mud seal comprising a plurality of sealing elements this is only an example and the invention may be used for single or multiple sealing elements.

While the present invention has been described with reference to a seal assembly for sealing mud use in drilling operations, similar assemblies may be used in other high pressure sealing applications where the staged pressure reduction is advantageous. One or more lip seals 22, 24 may be used as excluder seals in these assemblies. These lip seals may alternatively be spring energised. The polymer seals used in the staged pressure reduction stage of the seal assembly may be replaced by any suitable elastomeric or polymeric sealing element.

While in the embodiment illustrated in FIG. 1 both connectors 12, 20 are connected to the seal assembly 10, so as to permit tilting relative to a transverse plane, only one of the connectors 12, 20 may be so connected.

The invention claimed is:

1. An elastomeric or polymeric seal assembly comprising a first component and a second component, an annular elastomeric or polymeric sealing element in the form of a ring of channel section having a base and inner and outer limb formations extending from the base, an internal circumferential surface of the inner limb formation of said the sealing element sealingly engaging said a first component, the base of the sealing element abutting a radial annular face of said a second component and an external circumferential surface of the outer limb of the sealing element sealingly engaging an internal circumferential surface of said the second component, a vent being provided in the said internal circumferential surface of said the second component having a vent adjacent to the radial annular face, to vent the space between the external circumferential surface of the outer limb formation of the sealing element, the radial face of the second component and the internal circumferential surface of the second component, an inlet to the vent being defined by an annular groove in the internal circumferential surface of the second component, an annular helically wound element being provided in the annular groove to prevent extrusion of the sealing element into the vent, the helically wound element being formed from a strip of material of elongate section extending longitudinally of the helically wound element, with adjacent winds of the helically wound element material being spaced from one another when the helically wound element is located within the annular groove.

2. An elastomeric or polymeric seal assembly according to claim 1 in which the sealing element is a spring energised polymer seal.

3. An elastomeric or polymeric seal assembly according to claim 1 in which the second component is a seal housing.

4. An elastomeric or polymeric seal assembly according to claim 1 in which the second component is a seal housing ring defining said internal circumferential surface and said radial annular face extending inwardly from the internal circumferential surface against which the elastomeric or polymeric sealing element abuts to axially locate the elastomeric or polymeric sealing element, the inlet to the vent being provided adjacent the junction of the radial surface with the circumferential surface.

5. An elastomeric or polymeric seal assembly according to claim 4 in which the vent is provided by one or more longitudinally extending passageways extending in a wall of the housing ring, the passageways opening to the annular groove and to the end of the housing ring on the opposite side of the radial surface to the annular groove.

6. A seal assembly comprising a plurality of elastomeric or polymeric seal assemblies, each comprising, an annular elastomeric or polymeric sealing element in the form of a ring of channel section having a base and inner and outer limb formations extending from the base, an internal circumferential surface of the inner limb formation of the sealing element sealingly engaging a first component, the base of the sealing element abutting a radial annular face of a second component and an external circumferential surface of the outer limb of the sealing element sealingly engaging an internal circumferential surface of the second component, a vent being provided in the internal circumferential surface of the second component adjacent to the radial annular face, to vent the space between the external circumferential surface of the outer limb formation of the sealing element, the radial annular face of the second component and the internal circumferential surface of the second component, an inlet to the vent being defined by an annular groove in the internal circumferential surface of the second component, an annular helically wound element being provided in the annular groove to prevent extrusion of the sealing element into the vent, the helically wound element being formed from a strip of material of elongate section extending longitudinally of the helically wound element, with adjacent winds of the helically wound element being spaced from one another when the helically wound element is located within the annular groove.

7. A seal assembly as claimed in claim 6 in which the elastomeric or polymeric seal assemblies define a plurality of barrier chambers into which a barrier fluid under pressure may be introduced, the pressure of barrier fluid in each chamber decreasing from a high pressure side of the seal assembly to a low pressure side, the vent from each elastomeric or polymeric seal assembly having an outlet which opens to a chamber on the low pressure side of the elastomeric or polymeric sealing element.

8. A seal assembly as claimed in claim 7 in which a first connector adapted to be connected to a static fluid supply line is non-rotatably connected to a seal housing, a tubular member is rotatably mounted coaxially within the seal housing, a plurality of said elastomeric or polymeric seal assemblies are located between the seal housing and the tubular member in fixed rotational relationship to the seal housing, annular gaps being provided between adjacent housing rings to allow the outlet from the vent to open into the chamber on the lower pressure side of the elastomeric or polymeric sealing element.

9. A seal assembly as claimed in claim 8 in which the first connector is connected to the seal housing and/or a second connector is connected to the tubular member in a manner which will permit tilting of the connector with respect to the seal housing/tubular member relative to a transverse plane.

10. A seal assembly as claimed in claim 8 in which a static seal is provided between the first connector and the seal housing and/or between a second connector and to the tubular member.

11. A seal assembly between a first and second relatively rotatable component, the first component extending coaxially of a bore of the second component the external surface of the first component being spaced radially of the surface of the bore, comprising an excluder seal being located at a high pressure end of the seal assembly, the excluder seal acting to prevent the flow of fluid into the space between the external surface of the first component and the internal surface of the bore, and a plurality elastomeric or polymeric sealing elements acting between the external surface of the first component and the internal surface of the bore, said plurality elastomeric or polymeric sealing elements being spaced axially of the excluder seal and of one another to define a series of chambers therebetween, inlets being provided to the chambers between adjacent elastomeric or polymeric sealing elements whereby a barrier fluid under pressure may be introduced into the chambers wherein said elastomeric or polymeric sealing elements comprise an annular elastomeric or polymeric sealing element in the form of a ring of channel section having a base and inner and outer limb formations extending from the base, an internal circumferential surface of the inner limb formation of the sealing element sealingly engaging a first component, the base of the sealing element abutting a radial annular face of a second component and an external circumferential surface of the outer limb of the sealing element sealingly engaging an internal circumferential surface of the second component, said internal circumferential surface of said second component having a vent adjacent to the radial annular face, to vent the space between the external circumferential surface of the outer limb formation of the sealing element, the radial annular face of the second component and the internal circumferential surface of the second component, an inlet to the vent being defined by an annular groove in the internal circumferential surface of the second component, an annular helically wound element being provided in the annular groove to prevent extrusion of the sealing element into the vent, the helically wound element being formed from a strip of material of elongate section extending longitudinally of the helically wound element, with adjacent winds of the helically wound element being spaced from one another when the helically wound element is located within the annular groove.

12. A seal assembly according to claim 11 in which the excluder seal comprises a lip seal, the lip seal having a base formation with a pair of limbs extending towards the high pressure side of the seal assembly, the limbs defining lip formations, the limbs being forced apart by the pressure of the sealed fluid, so that one lip makes a seal with the first component and the other lip makes a seal with the second component.

13. A seal assembly according to claim 12 in which the lip seal is axially slidable between the first and second components, so that when the pressure of fluid in the chamber between the excluder seal and a first elastomeric or polymeric sealing elements immediately adjacent the excluder seal, is below that on the high pressure side of the seal assembly, the excluder seal will slide towards said first elastomeric or polymeric sealing element to compress the fluid in the chamber therebetween and equalise the pressures.

14. A seal assembly according to claim 11 in which an inlet is provided to the chamber defined between the excluder seal and a first elastomeric or polymeric sealing elements element immediately adjacent the excluder seal, by which a barrier fluid under a pressure in excess of that on the high pressure side of the seal assembly, may be introduced into the chamber.

15. A seal assembly according to claim 14 in which barrier fluid is introduced into the chamber between the excluder seal and first elastomeric or polymeric sealing elements as a volumetric dose at intervals, in order to maintain the pressure in the chamber in excess of that on the high pressure side of the seal assembly.

16. A seal assembly according to claim 11 in which the excluder seal comprises two or more lip seals spaced axially of one another.

17. A seal assembly according to claim 11 in which the excluder seal comprises one or more spring energised polymer seals.

18. A seal assembly according to claim 11 in which the excluder seal is a mechanical face seal assembly, the mechanical seal face assembly defining a chamber between the mechanical face seal assembly and a first annular sealing element immediately adjacent the excluder seal, said chamber having an inlet by which a barrier fluid under a pressure in excess of the pressure on the high pressure side of the seal assembly may be introduced into the chamber.

19. A seal assembly according to claim 18 in which the elastomeric or polymeric seal assemblies each have a pair of limbs, one limb providing a seal with one component and the other limb providing a seal with the other component, a first elastomeric or polymeric seal assembly immediately adjacent the excluder seal is mounted with its limbs directed away from the excluder seal end of the seal assembly, the subsequent elastomeric or polymeric seal assemblies being mounted with their limbs directed towards the excluder seal end of the seal assembly, the chamber defined between the first elastomeric or polymeric seal assembly and next elastomeric or polymeric seal assembly being connected to a source of barrier fluid at a pressure in excess of the pressure on the high pressure side of the seal assembly, the pressure of barrier fluid in subsequent chambers defined between adjacent elastomeric or polymeric seal assemblies reducing in stages.

20. A seal assembly according to claim 11 in which the first component comprises a wash tube and the second component comprises a seal housing.

* * * * *